(12) United States Patent
Guo et al.

(10) Patent No.: US 7,191,456 B2
(45) Date of Patent: Mar. 13, 2007

(54) OPTICAL PICKUP HEAD FEEDING DEVICE

(75) Inventors: Bin-Hai Guo, Shenzhen (CN); Li-Ming Wan, Shenzhen (CN)

(73) Assignees: Hong Fu Jim Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 432 days.

(21) Appl. No.: 10/887,012

(22) Filed: Jul. 7, 2004

(65) Prior Publication Data

US 2005/0010940 A1  Jan. 13, 2005

(30) Foreign Application Priority Data

Jul. 8, 2003  (CN) ................ 03 2 67529

(51) Int. Cl.
G11B 7/085  (2006.01)
(52) U.S. Cl. ............................... 720/659
(58) Field of Classification Search ........ 720/659, 720/661, 664; 360/255.1–255.7, 256.1–256.7
See application file for complete search history.

(56) References Cited

U.S. PATENT DOCUMENTS 5,796,702 A * 8/1998 Bessho .............. 369/112.24
6,205,109 B1 * 3/2001 Furukawa et al. .......... 720/664
6,445,673 B2   9/2002 Park
6,710,979 B2 * 3/2004 Garrigues et al. ....... 360/255.1
2005/0149960 A1 * 7/2005 Pu ............................. 720/664
2006/0156323 A1 * 7/2006 Loh et al. .................. 720/664

FOREIGN PATENT DOCUMENTS

CN     00246428.4     7/2001

* cited by examiner

Primary Examiner—Allen Cao
(74) Attorney, Agent, or Firm—Wei Te Chung

(57) ABSTRACT

An optical pickup head feeding device (1) for driving an optical pickup head (4) of an optical recording/reproducing apparatus (100) has a motor (11), a motor housing (12) accommodating the motor, a first cone gear (13), a transmission gear subassembly (14), and a rack (15). The first cone gear is connected to and driven by the motor. The transmission gear subassembly has a second cone gear (142) and a spur gear (141) coaxially connected together, a diameter of second cone gear being greater than that of the spur gear. The second cone gear meshes with the first cone gear, and the spur gear meshes with the rack. The rack mates with the optical pickup head. The cooperative meshing of the first cone gear, the transmission gear subassembly and the rack gives the optical pickup head feeding device a low drive transfer ratio for precise positioning of the optical pickup head.

23 Claims, 5 Drawing Sheets

OPTICAL PICKUP HEAD FEEDING DEVICE

BACKGROUND OF THE INVENTION

1. Field of the Invention

The present invention generally relates to optical pickup head feeding devices, and more particularly to an optical pickup head feeding device used in an optical recording/reproducing apparatus such as an optical disk drive of a computer.

2. Description of Prior Art

A conventional optical recording/reproducing apparatus has an optical pickup head that emits a laser beam. This enables the apparatus to reproduce signals from an optical disk and record signals on an optical disk. The optical pickup head is driven by an optical pickup head feeding device, so that the head moves along a path corresponding to a radial direction of the optical disk.

FIG. 5 shows a conventional optical pickup head feeding device 80 which is used in an optical recording/reproducing apparatus 99. The optical pickup head feeding device 80 has a motor 801, a worm gear 802 connected to the motor 801, and a gear portion 803 attached to the optical pickup head 70. The gear portion 803 meshes with the worm gear 802. The motor 801 drives the optical pickup head 70 to move by transmission of the worm gear 802.

However, the optical pickup head feeding device 80 directly drives the optical pickup head 70 to move via the worm gear 802. A drive transfer ratio of the optical pickup head feeding device 80 is too high to ensure accurate operation of the optical recording/reproducing apparatus 99.

An optical pickup head feeding device which has a lower drive transfer ratio and correspondingly accurate operation is desired.

SUMMARY OF THE INVENTION

Accordingly, an object of the present invention is to provide an optical pickup head feeding device with a relatively low drive transfer ratio.

To achieve the above object, an optical pickup head feeding device in accordance with the present invention has a motor, a motor housing accommodating the motor, a first cone gear, a transmission gear subassembly and a rack. The first cone gear is connected to and driven by the motor. The transmission gear subassembly has a second cone gear and a spur gear coaxially connected together, a diameter of the second cone gear being greater than that of the spur gear. The second cone gear of the transmission gear subassembly meshes with the first cone gear, and the spur gear meshes with the rack. The rack mates with an optical pickup head of an associated optical recording/reproducing apparatus. The cooperative meshing of the first cone gear, the transmission gear subassembly and the rack gives the optical pickup head feeding device a low drive transfer ratio, which helps ensure precise positioning of the optical pickup head.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
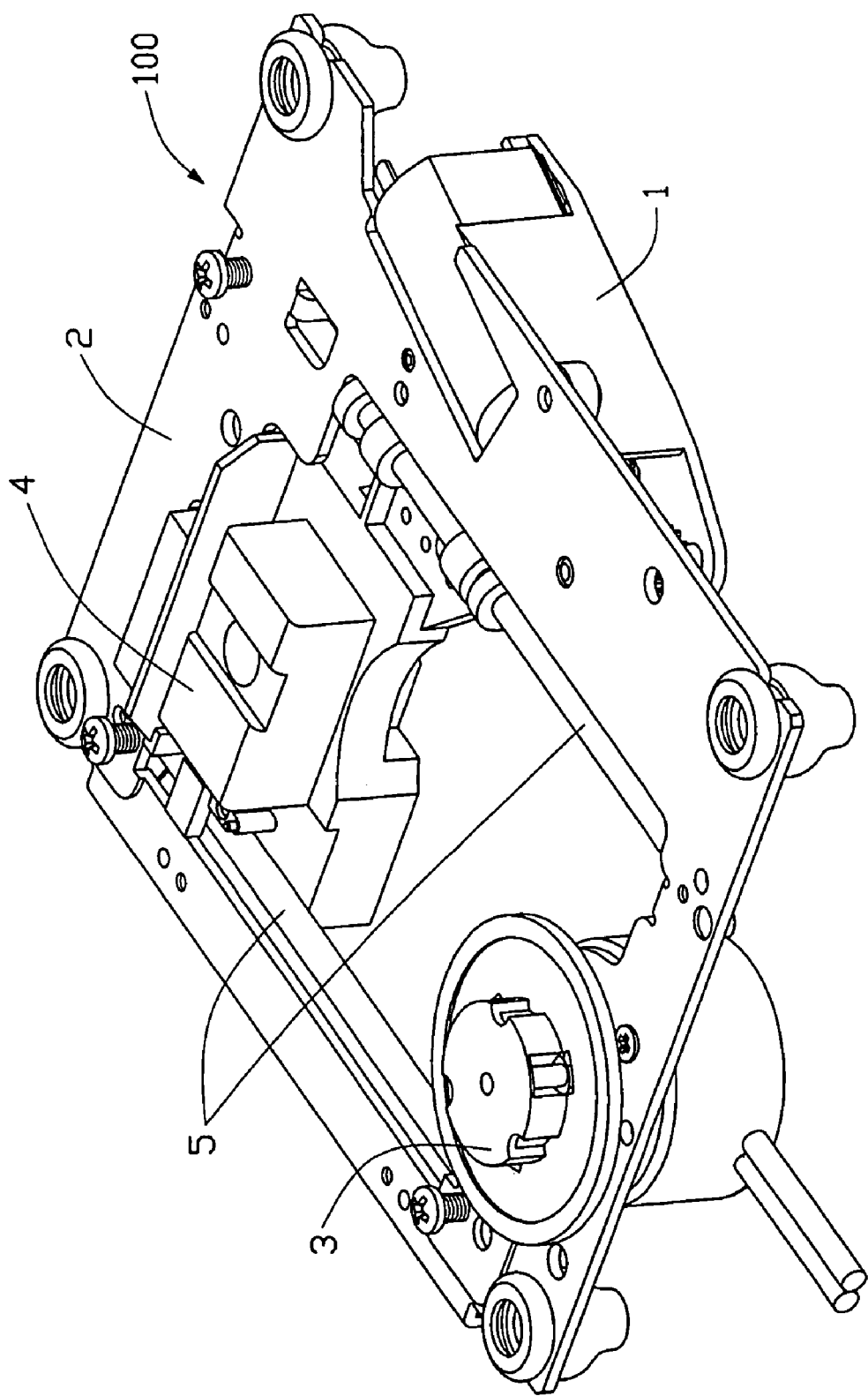
FIG. 1 is an isometric view of an optical recording/reproducing apparatus having an optical pickup head feeding device in accordance with the present invention.
Figure 2:
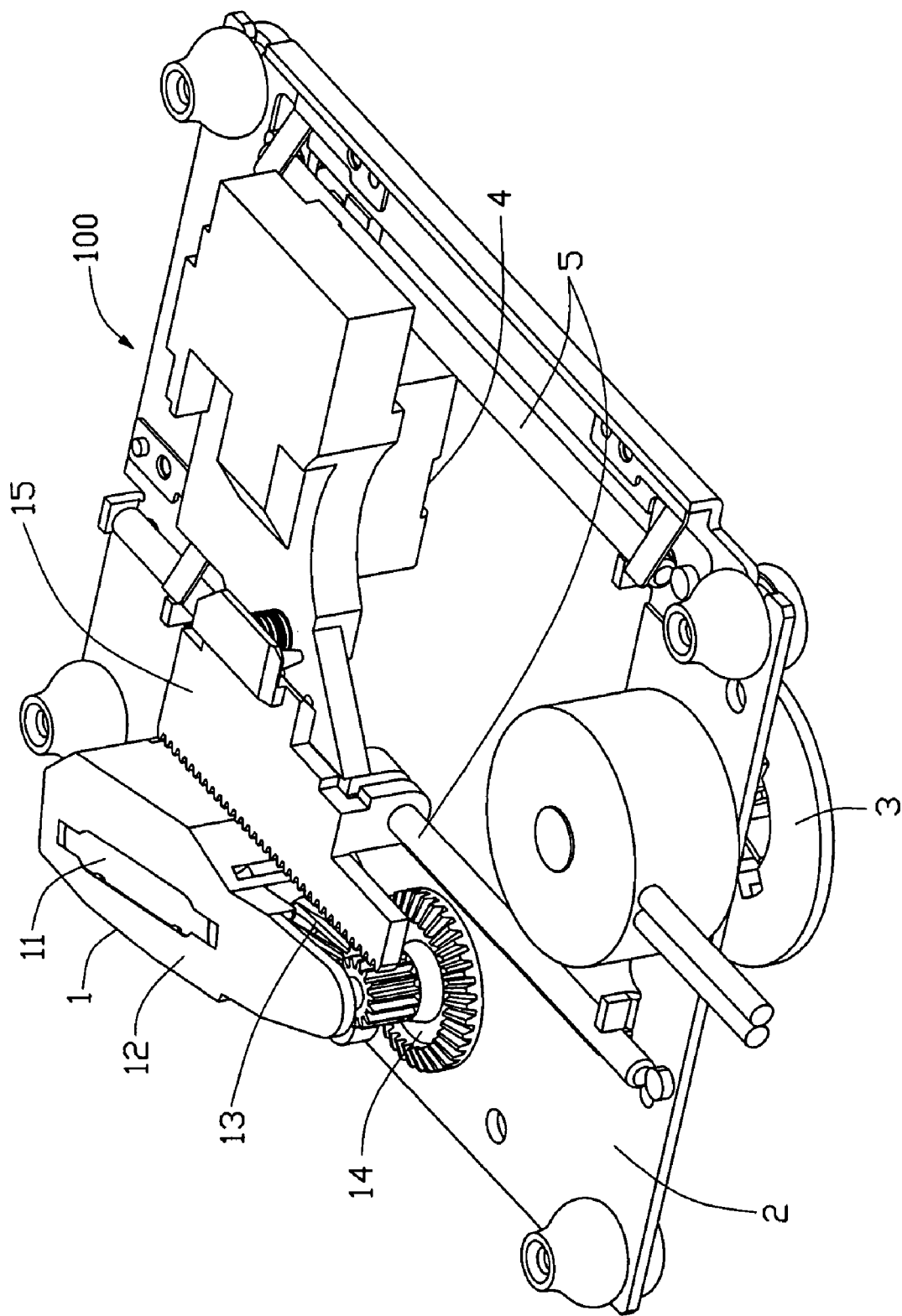
FIG. 2 is an inverted view of the optical recording/reproducing apparatus of FIG. 1.

Referring to FIGS. 1 and 2, an optical pickup head feeding device 1 in accordance with the present invention is used in an optical recording/reproducing apparatus 100. The optical recording/reproducing apparatus 100 also has a chassis 2, a turntable 3, an optical pickup head 4, and a guiding device 5. The turntable 3 is mounted on a first main surface of the chassis 2. The optical pickup head feeding device 1 and the guiding device 5 are mounted on an opposite second main surface of the chassis 2. The turntable 3 rotates an optical disk (not shown) engaged thereon. The optical pickup head 4 is driven by the optical pickup head feeding device 1 and is guided by the guiding device 5 along a predetermined path corresponding to a radial direction of the optical disk, in order to record signals on the optical disk or reproduce signals from the optical disk.

Figure 3:
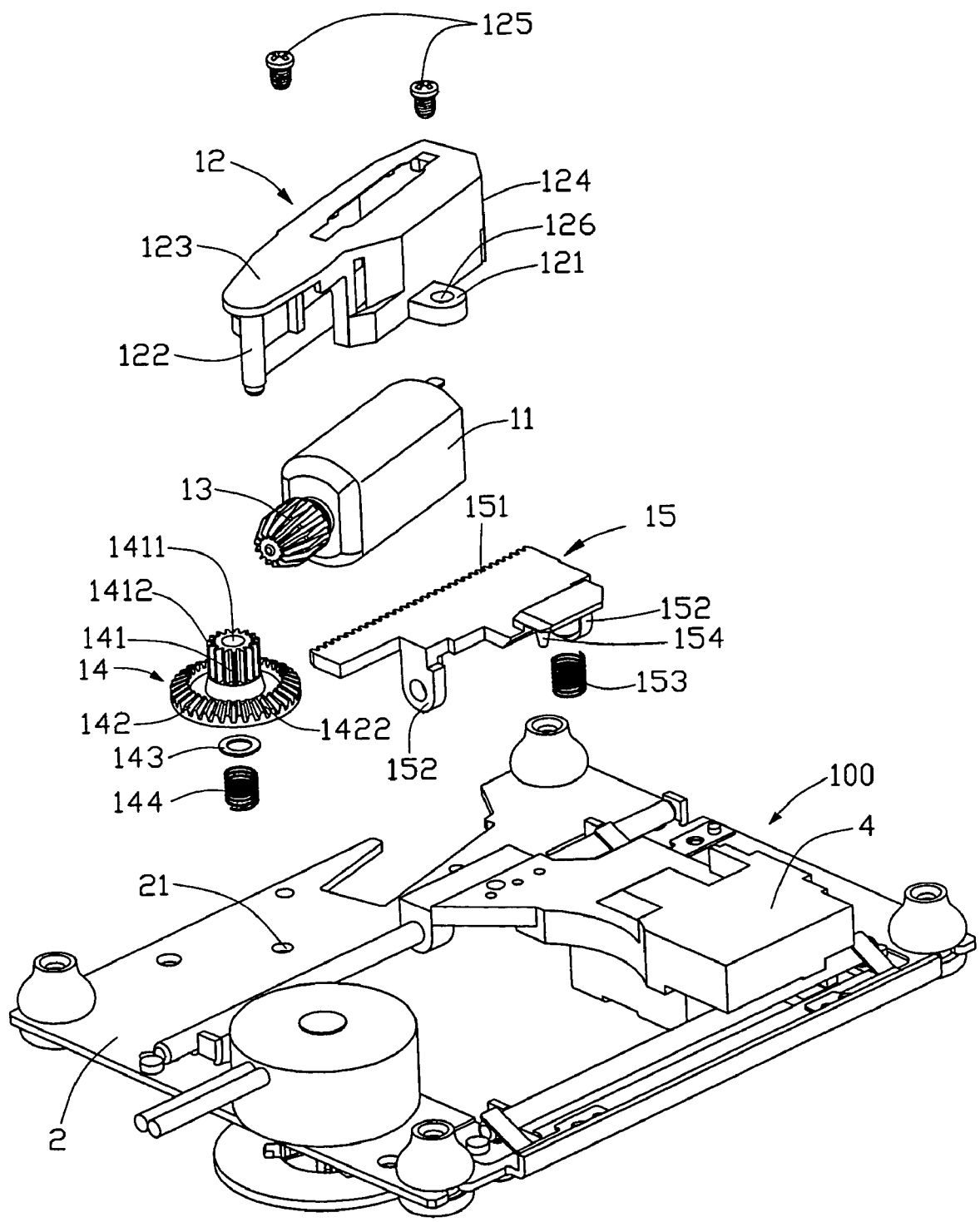
FIG. 3 is an isometric view of the optical pickup head feeding device exploded from the optical recording/reproducing apparatus of FIG. 2.

Referring to FIG. 3, the optical pickup head feeding device 1 has a motor 11, a motor housing 12, a first cone gear 13, a transmission gear subassembly 14 and a rack 15. The motor 11 and the transmission gear subassembly 14 are fixed on the chassis 2. The transmission gear subassembly 14 has a second cone gear 142 and a spur gear 141. The spur gear 141 is connected to the second cone gear 142, which is adjacent to the chassis 2. The second cone gear 142 and the spur gear 141 are coaxial. The second cone gear 142 meshes with the first cone gear 13, and the spur gear 141 meshes with the rack 15.

The motor housing 12 has a receptacle 124, and a tongue 123 extending from the receptacle 124. The tongue 123 is coplanar with a top surface (not labeled) of the receptacle 124. The receptacle 124 accommodates the motor 11 therein. Two ears 121 (only one visible) respectively extend from two sides of a bottom portion of the receptacle 124. Each ear 121 has a positioning hole 126 defined therethrough. The motor housing 12 is fixed on the chassis 2 by screws 125 being extended through the positioning holes 126 of the ears 121 and engaged in holes (not labeled) of the chassis 2. A pivot 122 extends perpendicularly down from an end portion of the tongue 123.

Figure 4:
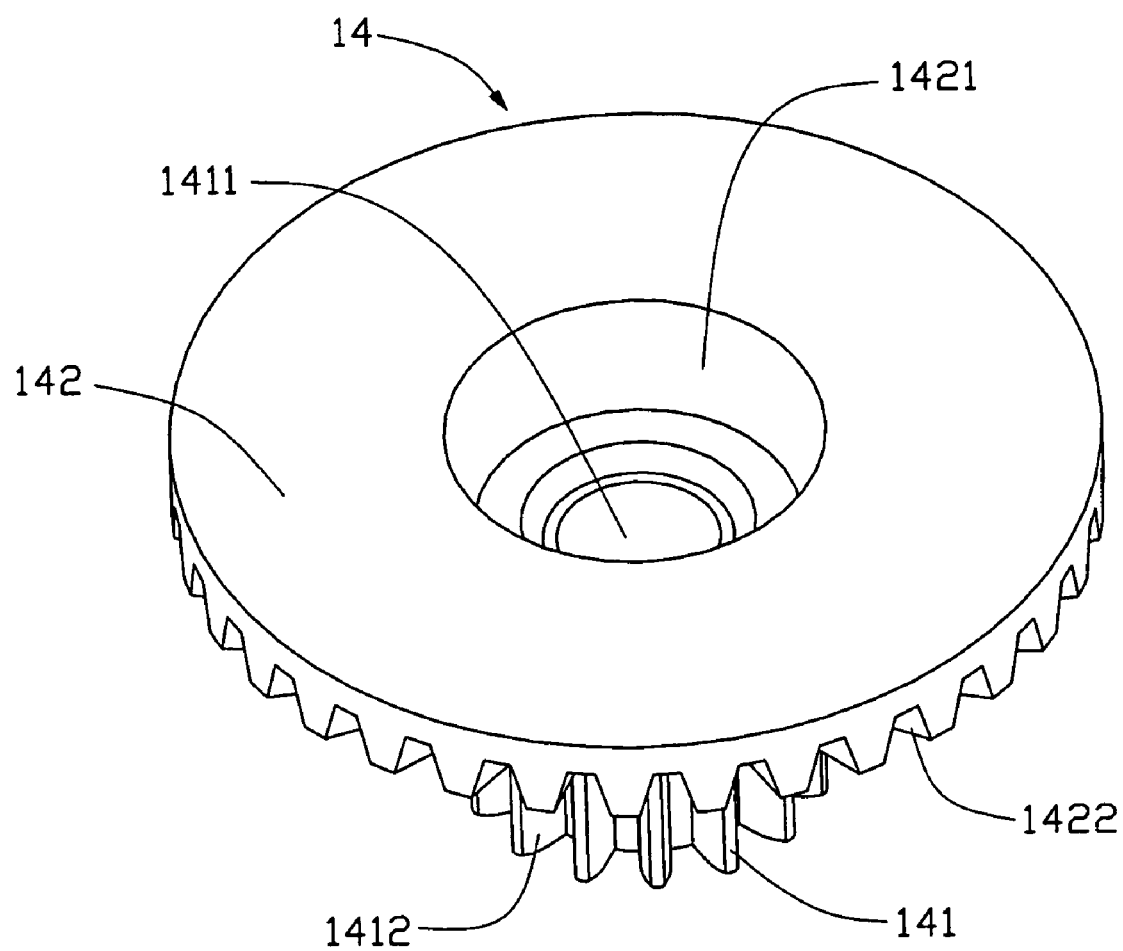
FIG. 4 is an enlarged, inverted view of a transmission gear subassembly of the optical pickup head feeding device of FIG. 3.
Figure 5:
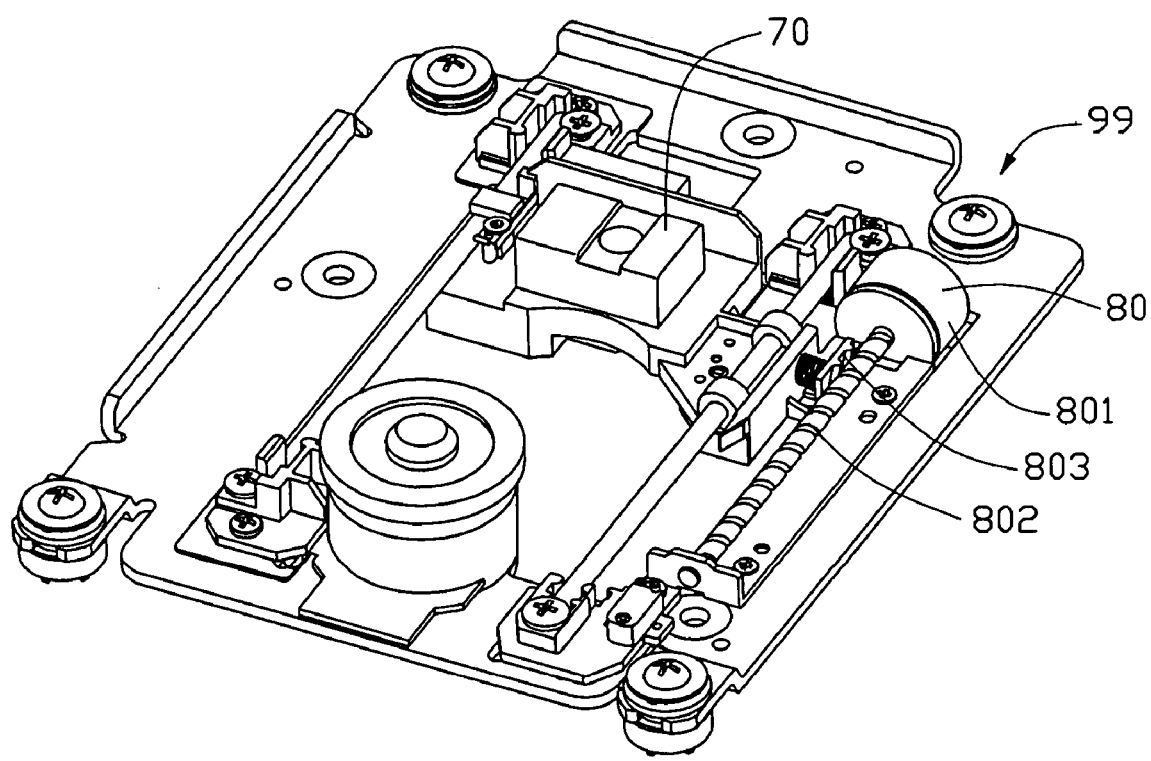
FIG. 5 is an isometric view of an optical recording/reproducing apparatus having a conventional optical pickup head feeding device.

The transmission gear subassembly 14 is located between the chassis 2 and the tongue 123 of the motor housing 12. The transmission gear subassembly 14 is fixed on the chassis 2 by mating of the pivot 122 in a hole 21 of the chassis 2, and can rotate about the pivot 122. Also referring to FIG. 4, the second cone gear 142 has a first hole 1421, and the spur gear 141 has a second hole 1411. The first and second holes 1421, 1411 are in communication with each other. A diameter of the first hole 1421 is larger than that of the second hole 1411, and thus a step (not labeled) is formed in the transmission gear subassembly 14 at a junction of the first and second holes 1421, 1411. A flat annular gasket 143 and a first spring 144 are accommodated in the first hole 1421 of the second cone gear 142. The gasket 143 is positioned on the step of the transmission gear subassembly 14, and the first spring 144 is located between the gasket 143 and the chassis 2. The gasket 143 prevents friction between the first spring 144 and the second cone gear 142 at the first hole 1421. The first spring 144 is for adjusting an engaging force between the first and second cone gears 13, 142. A diameter of the second cone gear 142 of the transmission gear subassembly 14 is greater than a diameter of the spur gear 141. The second cone gear 142 has a plurality of first teeth 1422, and the spur gear 141 has a plurality of second teeth 1412. An angle is defined between each first tooth 1422 of the second cone gear 142 and a corresponding second tooth 1412 of the spur gear 141.

The rack 15 is generally plate-shaped. A linear gear portion 151 is defined at one side edge of the rack 15, and meshes with the second tooth 1412 of the spur gear 141 of the transmission gear subassembly 14. A protuberance pin 154 extends perpendicularly downwardly from an opposite side of the rack 15. A second spring 153 is located between a main body of the rack 15 and the optical pickup head 4, and is positioned thereat by the protuberance pin 154. The second spring 153 adjusts the position of the rack 15 relative to the spur gear 141 of the transmission gear subassembly 14. Two rings 152 extend perpendicularly downwardly from a middle portion of the main body of the rack 15, for mating with the guiding device 5. Movement of the rack 15 drives the optical pickup head 4 to move along the guiding device 5, with the rings 152 of the rack 15 sandwiching a mating portion (not labeled) of the optical pickup head 4 therebetween.

In operation, the motor 11 drives the first cone gear 13 to rotate. Because the first cone gear 13 meshes with the second cone gear 142, the first cone gear 13 drives the transmission gear subassembly 14 to rotate. Because the spur gear 141 meshes with the rack 15, the transmission gear subassembly 14 drives the rack 15 to move along a path corresponding to a radial direction of the optical disk, and the rack 15 thus moves the optical pickup head 4 correspondingly.

If desired, the pivot 122 can be fixed on the chassis 2 by riveting or other suitable means.

The optical pickup head feeding device 1 in accordance with the present invention drives the optical pickup head 4 by meshing of the first cone gear 13, the transmission gear subassembly 14 and the rack 15. Unlike conventional optical pickup head feeding devices, this structure has a low drive transfer ratio that helps ensure precise positioning of the optical pickup head 4.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. An optical pickup head feeding device for driving an optical pickup head, comprising:
    a motor;
    a first cone gear connected with the motor;
    a rack connected with the optical pickup head; and
    a transmission gear subassembly mounted on a pivot, the transmission gear subassembly comprising a second cone gear and a spur gear connected together;
    wherein, the second cone gear of the transmission gear subassembly meshes with the first cone gear, and the spur gear of the transmission gear subassembly meshes with the rack.

2. The optical pickup head feeding device in accordance with claim 1, wherein the second cone gear and the spur gear of the transmission gear subassembly are coaxial with each other.

3. The optical pickup head feeding device in accordance with claim 2, wherein a diameter of the second cone gear is greater than a diameter of the spur gear.

4. The optical pickup head feeding device in accordance with claim 1, wherein the second cone gear has a first hole defined therethrough, the spur gear has a second hole defined therethrough, and the first hole communicates with the second hole.

5. The optical pickup head feeding device in accordance with claim 4, further comprising a gasket received in the first hole of the second cone gear.

6. The optical pickup head feeding device in accordance with claim 4, further comprising a first spring received in the first hole of the second cone gear.

7. The optical pickup head feeding device in accordance with claim 1, wherein the rack has a gear portion at a side thereof, and a pin extending from an opposite side thereof.

8. The optical pickup head feeding device in accordance with claim 7, further comprising a second spring sandwiched between the rack and the optical pickup head by the pin of the rack.

9. The optical pickup head feeding device in accordance with claim 1, further comprising a motor housing having a receptacle for accommodating the motor and a tongue extending from the receptacle.

10. The optical pickup head feeding device in accordance with claim 9, wherein the pivot perpendicularly extends from the tongue of the motor housing.

11. The optical pickup head feeding device in accordance with claim 1, wherein the pivot is adapted to be riveted on the chassis.

12. An optical pickup head feeding device for driving an optical pickup head of an optical recording/reproducing apparatus, comprising:
    a motor adapted to be located on a chassis of the optical recording/reproducing apparatus;
    a motor housing accommodating the motor therein;
    a first cone gear connected with the motor;
    a rack connected with the optical pickup head; and
    a transmission gear subassembly mounted on a pivot, the transmission gear subassembly comprising a second gear and a third gear connected together;
    wherein, the second gear of the transmission gear subassembly is adapted to be adjacent to the chassis, and the second and third gears of the transmission gear subassembly respectively mesh with the first cone gear and the rack.

13. The optical pickup head feeding device in accordance with claim 12, wherein the second gear is a cone gear, the third gear is a spur gear, and a diameter of second gear is greater than a diameter of the third gear.

14. The optical pickup head feeding device in accordance with claim 13, wherein the second gear has a first hole defined therethrough, the third gear has a second hole defined therethrough, and the first hole communicates with the second hole.

15. The optical pickup head feeding device in accordance with claim 14, wherein the transmission gear subassembly further comprises a gasket accommodated in the first hole of the second gear.

16. The optical pickup head feeding device in accordance with claim 15, wherein the transmission gear subassembly further comprises a first spring accommodated in the first hole of the second gear and adapted to be located between the gasket and the chassis.

17. The optical pickup head feeding device in accordance with claim 12, wherein the rack has a gear portion at a side thereof and a pin extending from an opposite side thereof, and the gear portion of the rack meshes with the third gear.

18. The optical pickup head feeding device in accordance with claim 17, further comprising a second spring sandwiched between the rack and the optical pickup head by the pin of the rack.

19. The optical pickup head feeding device in accordance with claim 14, wherein the motor housing has a receptacle accommodating the motor therein and a tongue extending from the receptacle.

20. The optical pickup head feeding device in accordance with claim 19, wherein the pivot perpendicularly extends from the tongue of the motor housing, and is adapted to fix the transmission gear subassembly on the chassis via the first hole of the second gear and the second hole of the third gear.

21. An optical pickup head feed device comprising:
a motor defining a first rotation axis along a first direction;
a rack spaced from the motor and moveable along said first direction;
a pickup head connected to the rack; and
a speed-reduction transmission gear subassembly defining a second rotation axis along a second direction perpendicular to said first direction,
said transmission gear including a first gear located at a first level of said second rotation axis and engaged with the rack, and a second gear located at a second level of said second rotation axis and engaged with an output gear of the motor.

22. The optical pickup head feed device as claimed in claim 21, wherein the second gear and the output gear are both bevel gears.

23. The optical pickup head feed device as claimed in claim 21, wherein a buffer spring supports said transmission gear.

* * * * *